United States Patent
Park et al.

(10) Patent No.: US 7,382,096 B2
(45) Date of Patent: Jun. 3, 2008

(54) FLAT FLUORESCENT LAMP AND LIQUID CRYSTAL DISPLAY DEVICE HAVING THE SAME

(75) Inventors: Hae-Il Park, Seoul (KR); Sang-Yu Lee, Yongin-si (KR); Jin-Seon Byun, Seoul (KR); Joong-Hyun Kim, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 547 days.

(21) Appl. No.: 11/199,722

(22) Filed: Aug. 8, 2005

(65) Prior Publication Data

US 2006/0125401 A1 Jun. 15, 2006

(30) Foreign Application Priority Data

Dec. 13, 2004 (KR) ............... 10-2004-0104953

(51) Int. Cl.
*H01J 17/02* (2006.01)
*H01J 61/02* (2006.01)

(52) U.S. Cl. ............. 313/611; 313/493; 313/609
(58) Field of Classification Search ......... 313/493, 313/609, 317, 611
See application file for complete search history.

(56) References Cited

U.S. PATENT DOCUMENTS

| 2,915,664 | A | * | 12/1959 | Lemmers | 313/493 |
| 5,479,071 | A | * | 12/1995 | Lynn | 313/514 |
| 7,042,147 | B2 | * | 5/2006 | Sauska et al. | 313/493 |
| 2003/0127964 | A1 | * | 7/2003 | Magai | 313/493 |
| 2004/0195970 | A1 | * | 10/2004 | Lin et al. | 313/634 |
| 2007/0145877 | A1 | * | 6/2007 | Hsu et al. | 313/317 |

* cited by examiner

*Primary Examiner*—Peter Macchiarolo
(74) *Attorney, Agent, or Firm*—MacPherson Kwok Chen & Heid LLP (57) ABSTRACT

A flat fluorescent lamp includes a lamp body and an external electrode. The lamp body includes a plurality of discharge spaces. Each of the discharge spaces includes a first discharge region having a first space width and a first space length, a second discharge region having a second space width and a second space length, and a third discharge region having a third space width and third space length. The second discharge region is disposed between the first and third discharge regions. The second space width is smaller than the first and third space widths, and the second space length is smaller than the first and third space lengths. Thus, an electrode part of the flat fluorescent lamp is prevented from being blackened due to dendrite generated at the electrode part, so that the display quality of the liquid crystal display device having the flat fluorescent lamp can be improved.

9 Claims, 7 Drawing Sheets

FLAT FLUORESCENT LAMP AND LIQUID CRYSTAL DISPLAY DEVICE HAVING THE SAME

CROSS-REFERENCE TO RELATED APPLICATIONS

This application relies for priority upon Korean Patent Application No. 2004-104953 filed on Dec. 13, 2004, the contents of which are herein incorporated by reference in its entirety.

BACKGROUND OF THE INVENTION

1. Field of the Invention

The present invention relates to a flat fluorescent lamp and a liquid crystal display device having the flat fluorescent lamp. More particularly, the present invention relates to a flat fluorescent lamp capable of improving display quality and a liquid crystal display device having the flat fluorescent lamp.

2. Description of the Related Art

A liquid crystal display (LCD) device displays an image using liquid crystal. The LCD device has many merits such as lightweight, thin thickness, low driving voltage and low power consumption. Therefore, the LCD device is used in various fields.

The LCD panel is a non-emissive device that does not generate light by itself. Thus, the LCD device includes an LCD panel displaying an image and a backlight assembly providing the LCD panel with light.

A conventional backlight assembly employs a cold cathode fluorescent lamp (CCFL) a s a light source. As the size of an LCD device having the conventional backlight assembly increases, the number of CCFLs employed in the backlight assembly also increases. Thus, manufacturing cost increases, and optical characteristics such as luminance uniformity are lowered.

In order to solve the above-mentioned problems, a flat fluorescent lamp has been developed. A conventional flat fluorescent lamp includes a lamp body divided into a plurality of discharge spaces and a n external electrode formed on a n outer surface of the lamp body to apply a discharge voltage thereto. The conventional flat fluorescent lamp generates plasma discharge in each discharge space by applying the discharge voltage to the external electrode from an inverter, and then emits light using the plasma discharge.

The conventional flat fluorescent lamp includes an electrode part and a light emitting part. Recently, a flat fluorescent lamp having an enlarged area of the electrode part in comparison with the light emitting part has been developed to improve luminance and light using efficiency. However, when the flat fluorescent lamp is driven, dendrite is rapidly generated at a portion that the electrode part and the light emitting part meet each other. Then, the generated dendrite diffuses into the light emitting part. The dendrite is generated due to mercury (Hg) ion deposition induced from heats and electric fields generated at the electrode part. The dendrite advances toward the light emitting part, so that display quality of an LCD device having the flat fluorescent lamp is deteriorated.

SUMMARY

In accordance with the present invention, a flat fluorescent lamp capable of inhibiting blackening thereof that may be incurred due to the presence of dendrite at the electrode part is provided.

In accordance with the present invention, a liquid crystal display device having the above-mentioned flat fluorescent lamp is also provided.

In one aspect of the present invention, a flat fluorescent lamp includes a lamp body and an external electrode. The lamp body comprises a plurality of discharge spaces. Each of the discharge spaces comprises a first discharge region having a first space width and a first space length, a second discharge region having a second space width and a second space length, and a third discharge region having a third space width and third space length. The second discharge region is disposed between the first and third discharge regions. The second space width is smaller than the first and third space widths, and the second space length is smaller than the first and third space lengths. The external electrode is formed on an end portion of the lamp body such that a longitudinal direction of the external electrode is substantially perpendicular to a longitudinal direction of the discharge spaces.

The lamp body may include a first substrate and a second substrate. The second substrate includes a plurality of discharge space portions spaced apart from the first substrate to define the discharge spaces, a plurality of space dividing portions each of which is disposed between adjacent discharge space portions and makes contact with the first substrate, and a sealing portion corresponding to edge portions of the second substrate. The first and second substrates are combined with each other through the sealing portion.

Each of the space dividing portions may include a first division region corresponding to the first discharge region and having a first division width, a second division region corresponding to the second discharge region and having a second division width that is wider than the first division width, and a third division region corresponding to the third discharge region and having a third division width that is substantially the same as the first division width. The second division region is disposed between the first and third division regions. The first division region has a first division length that is longer than a width of the external electrode.

In another aspect of the present invention, an LCD device includes a flat fluorescent lamp and an LCD panel. The flat fluorescent lamp generates light. The flat fluorescent lamp includes a lamp body and an external electrode. The lamp body includes a plurality of discharge spaces. Each of the discharge spaces includes a first discharge region having a first space width and a first space length, a second discharge region having a second space width and a second space length, and a third discharge region having a third space width and third space length. The second discharge region is disposed between the first and third discharge regions. The second space width is smaller than the first and third space widths, and the second space length is smaller than the first and third space lengths. The external electrode formed on an end portion of the lamp body such that a longitudinal direction of the external electrode is substantially perpendicular to a longitudinal direction of the discharge spaces. The LCD panel displays an image by using the light provided from the flat fluorescent lamp.

According to the flat fluorescent lamp and the LCD device having the flat fluorescent lamp, an electrode part of the flat fluorescent lamp is prevented from being blackened due to dendrite generated at the electrode part, so that display quality of the liquid crystal display device may be improved.

BRIEF DESCRIPTION OF THE DRAWINGS

The above and other features and advantage points of the present invention will become more apparent by describing in detailed exemplary embodiments thereof with reference to the accompanying drawings, in which.

DESCRIPTION OF THE EMBODIMENTS

The present invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like reference numerals refer to similar or identical elements throughout.

Figure 1:
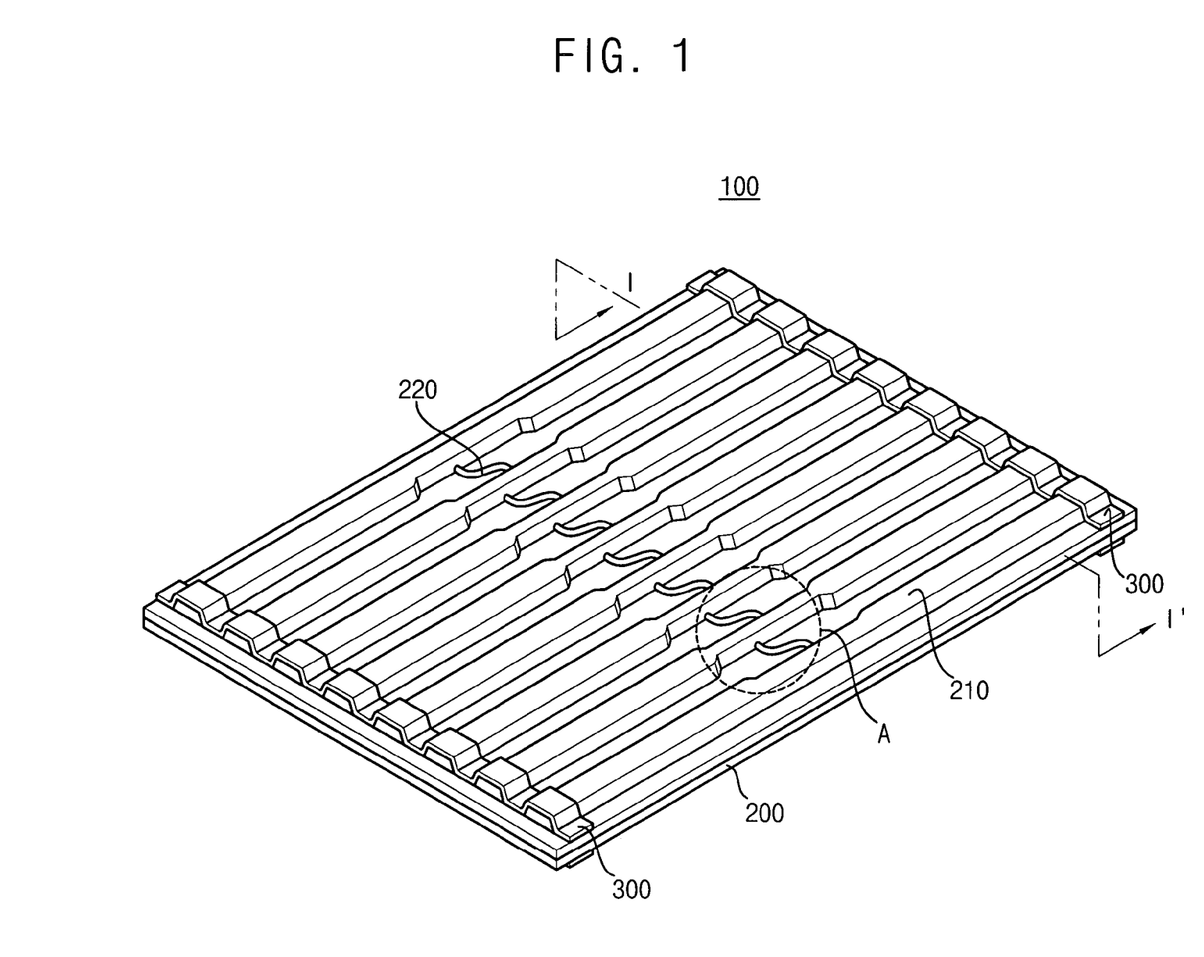
FIG. 1 is a perspective view illustrating a flat fluorescent lamp according to an exemplary embodiment of the present invention.
Figure 2:
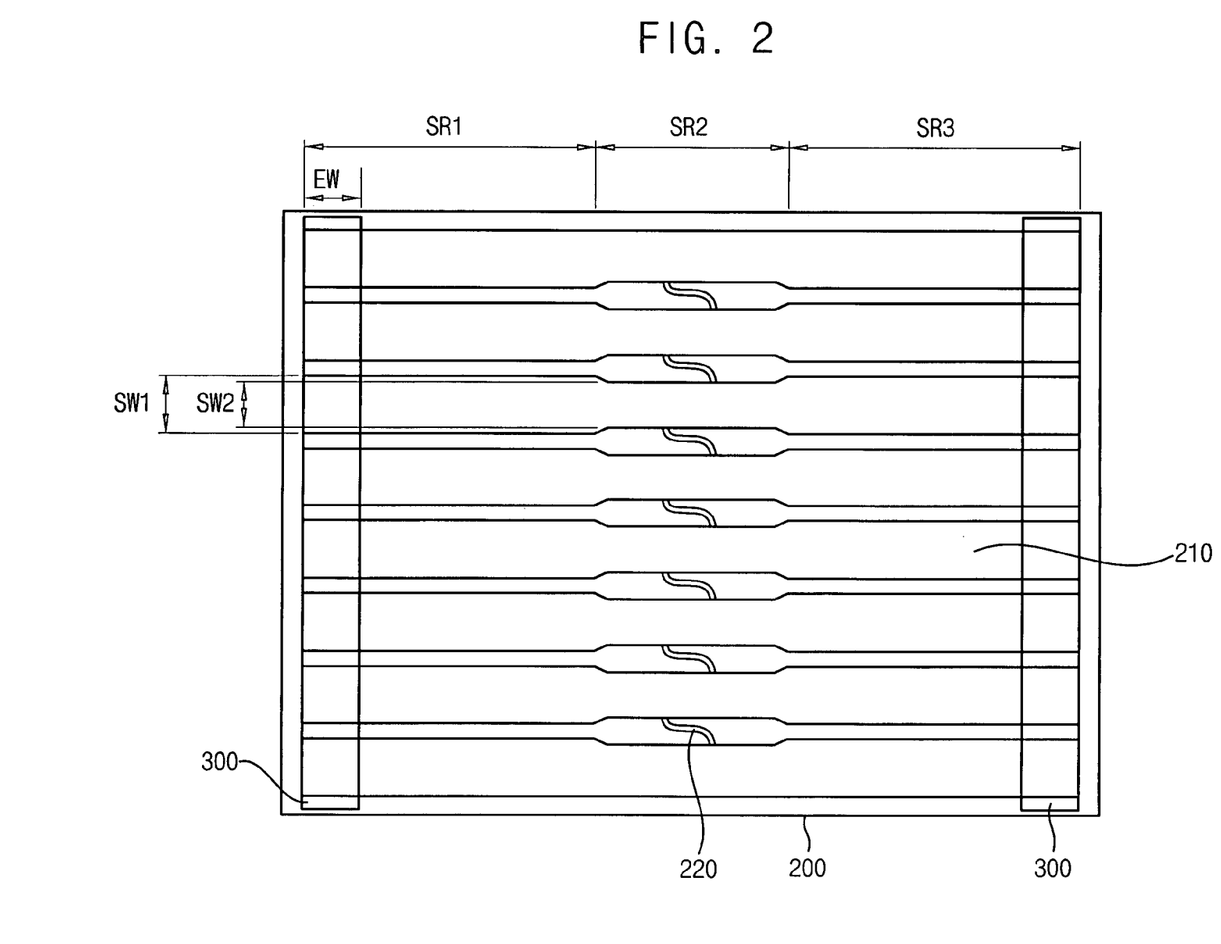
FIG. 2 is a plan view illustrating the flat fluorescent lamp shown in FIG. 1.

FIG. 1 is a perspective view illustrating a flat fluorescent lamp according to an exemplary embodiment of the present invention. FIG. 2 is a plan view illustrating the flat fluorescent lamp shown in FIG. 1;

Referring to FIGS. 1 and 2, a flat fluorescent lamp 100 includes a lamp body 200 and an external electrode 300.

The lamp body 200 includes a plurality of discharge spaces 210. Each of the discharge spaces 210 includes a first discharge region SR1 having a first space width SW1, a second discharge region SR2 having a second space width SW2 that is smaller than the first space width SW1, and a third discharge region SR3 having a third space width that is substantially same as the first space width SW1. The first, second and third discharge regions SR1, SR2 and SR3 have a first space length, a second space length and a third space length, respectively. For example, the first and third space lengths are substantially same. The first and second space widths SW1 and SW2 correspond to a width along a direction substantially perpendicular to a longitudinal direction of the discharge spaces 210. The first, second and third space lengths correspond to a length along a direction that is substantially in parallel with the longitudinal direction of the discharge space 210. The second discharge region SR2 is disposed between the first and third discharge regions SR1 and SR3.

The external electrode 300 is formed on an end portion of the lamp body 200, such that a longitudinal direction of the external electrode 300 is substantially perpendicular to the longitudinal direction of the discharge spaces 210. The external electrode 300 is formed on an outer surface of the lamp body 200. The external electrode 300 is formed on at least one of an upper surface and a lower surface of the lamp body 200. An electrode width EW of the external electrode 300 is smaller than the first and third space lengths of the first and third discharge regions SR1 and SR3, respectively, so that the external electrode 300 partially overlaps with the first and third discharge regions SR1 and SR3.

In one embodiment, the width of the first discharge region SR1 gradually decreases to form the second discharge region SR2 having the second space width SW2. In other words, a transitional tapered portion is formed between the first and second discharge regions SR1 and SR2. In addition, the electrode width EW is smaller than the first space length. Thus, the tapered portion, where the first and second discharge regions SR1 and SR2 meet each other, is spaced apart from the external electrode 300, thereby preventing blackening of the tapered portion. As the first and third space lengths of the first and third discharge regions SR1 and SR3 are made longer, bright lines that are displayed on the screen are reduced. However, when the second space length becomes too short, forming a connection passage 220 becomes difficult. Therefore, the first and third lengths of the first and third discharge regions SR1 and SR3 are adjusted by the connection passage 220.

The lamp body 200 includes the connection passage 220 connecting the discharge spaces 210 that are adjacent to each other. The connection passage 220 is formed between the discharge spaces 210 at the second discharge region SR2. The connection passage 220 provides a passage through which air and discharge gas may flow. When the air in the discharge spaces 210 is exhausted and the discharge gas is injected into the discharge spaces 210, the air and the discharge gas may flow therethrough, respectively. The second discharge region SR2 has the space width SW2 narrower than the space width SW1 of the first discharge region SR1 to provide space for forming the connection passage 220.

Figure 3:
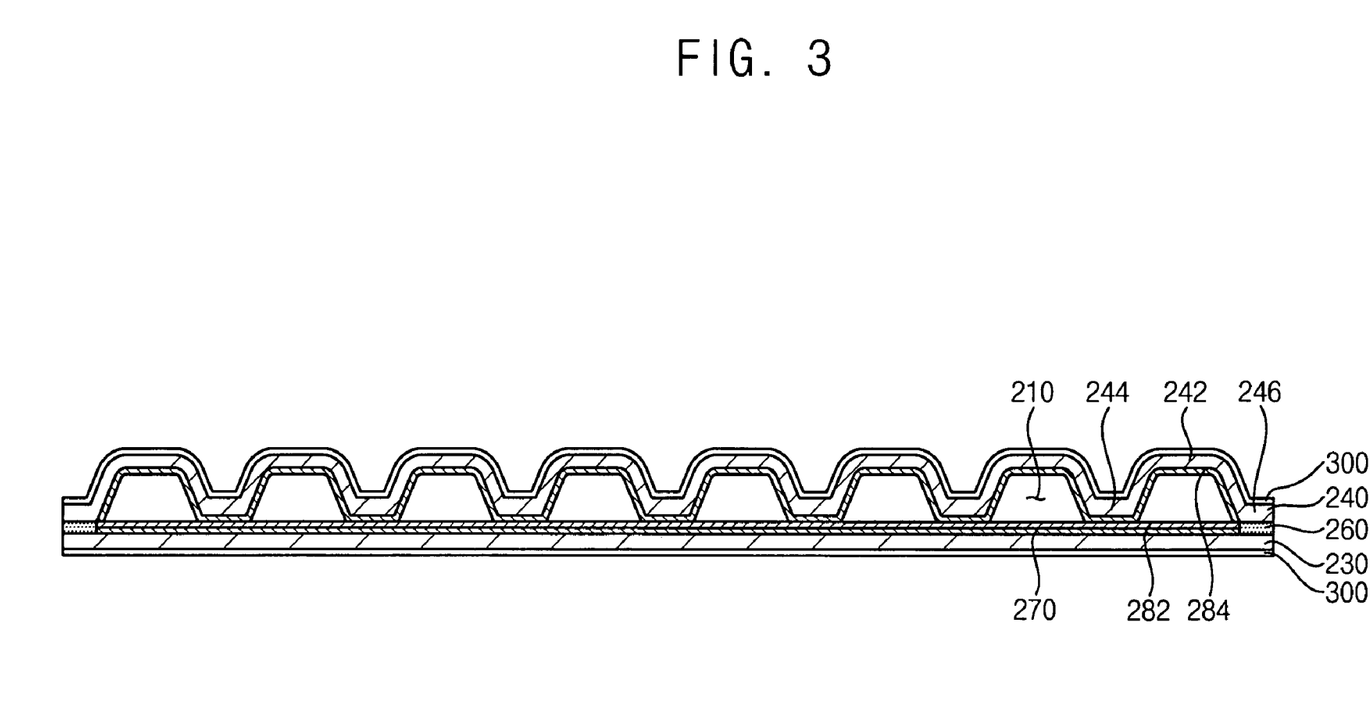
FIG. 3 is a cross-sectional view taken along a line I-I' in FIG. 1.

FIG. 3 is a cross-sectional view taken along a line I-I' in FIG. 1.

Referring to FIGS. 1 and 3, the flat fluorescent lamp 100 includes the lamp body 200 including the discharge spaces 210 and the external electrode 300 formed on the end portion of the lamp body 200 such that the electrode 300 is substantially perpendicular to the discharge spaces 210.

The lamp body 200 includes a first substrate 230 and a second substrate 240 combined with the first substrate 230 to form the discharge spaces 210.

The first substrate 230 has a rectangular plate shape having a predetermined thickness. The first substrate 230 comprises, for example, glass. The first substrate 230 may comprise a material blocking ultraviolet (UV) light in order to prevent UV light generated in the discharge spaces 210 from leaking through the first substrate 230.

The second substrate 240 comprises a transparent material to transmit a visible light generated from the discharge spaces 210. The second substrate 240 comprises, for example, glass. The second substrate 240 may include a UV light blocking material in order to prevent UV light generated in the discharge spaces 210 from leaking. The second substrate 240 includes a plurality of discharge space portions 242, a plurality of space dividing portions 244 and a sealing portion 246. The discharge space portions 242 of the second substrate 240 are spaced apart from the first substrate 230 to define the discharge spaces 210. Each of space dividing portions 244 is formed between the discharge space portions 242, and makes contact with the first substrate 230 when the first and second substrates 230 and 240 are combined with each other. The sealing portion 246 corresponds to an edge portion of the second substrate 240. The first and second substrates 230 and 240 are coupled to each other through the sealing portion 246.

The second substrate 240 having the above-described shape may be formed, for example, through a molding process. In detail, a flat base substrate is heated and compressed by a mold to form the second substrate 240 having the discharge space portions 242, the space dividing portions 244 and the sealing portion 246. Alternatively, the second substrate 240 may be formed by blowing air into the heated base substrate.

A cross-section of each of the discharge space portions 242 of the second substrate 240 has, for example, a trapezoidal shape, as shown in FIG. 3. Alternatively, the cross-section of each of the discharge space portions 242 of the second substrate 240 may have a semicircular shape, rectangular shape, arch shape, etc. The cross-section of the second substrate may have a rounded or curved shape.

The first and second substrates 230 and 240 are combined with each other, for example, through a sealing member 260 such as frit. The frit is a mixture of glass and metal and has a lower melting point than glass. The sealing member 260 is disposed between the first substrate 230 and the sealing portion 246 of the second substrate 240. Then, the sealing member 260 is heated to combine the first and second substrates 230 and 240 with each other.

The space dividing portions 244 are compressed toward the first substrate 230 to make contact with the first substrate 230 due to a pressure difference between an inside and an outside of the lamp body 200. In detail, when the first and second substrates 230 and 240 are combined with each other, air disposed in the discharge spaces 210 is exhausted, and then discharge gas is injected into the discharge spaces 210. The discharge gas including, for example, mercury (Hg), neon (Ne), argon (Ar), xenon (Xe), krypton (Kr), etc. is injected into the discharge space 210 such that a pressure of the discharge spaces 210 becomes about 50 torr to about 70 torr. Atmospheric pressure is about 760 torr, which is much greater than the pressure within the discharge spaces 210. Thus, a force from the outside toward the inside of the lamp body 200 is generated by above-described pressure difference between the inside and the outside of the lamp body 200, thereby compressing the space dividing portions 244 of the second substrate 240 toward the first substrate 230.

The lamp body 200 further includes a light-reflecting layer 270, a first fluorescent layer 282 and a second fluorescent layer 284. The light-reflecting layer 270 is formed on an inner surface of the first substrate 230 that faces the second substrate 240. The first fluorescent layer 282 is formed on an upper surface of the light-reflecting layer 270. The second fluorescent layer 284 is formed on an inner surface of the second substrate 240 that faces the first substrate 230.

The first and second fluorescent layers 282 and 284 transform UV light generated by the discharge gas into visible light. The light-reflecting layer 270 reflects the visible light emitted from the first and second fluorescent layers 282 and 284 toward the second substrate 240 to prevent the visible light from leaking through the first substrate 230. The light-reflecting layer 270 may comprise metal oxide in order to increase optical reflectivity and decrease a change of a color coordinate. The light-reflecting layer 270 comprises, for example, aluminum oxide ($Al_2O_3$), barium sulfate ($BaSO_4$), etc.

The light-reflecting layer 270, the first fluorescent layer 282 and the second fluorescent layer 284 are spray coated in the form of a thin film on the first and second substrates 230 and 240 before the first and second substrates 230 and 240 are combined with each other. The light-reflecting layer 270, the first fluorescent layer 282 and the second fluorescent layer 284 are formed on an entire portion of the first and second substrates 230 and 240 except for a portion corresponding to the sealing portion 246. Alternatively, the light-reflecting layer 270, the first fluorescent layer 282 and the second fluorescent layer 284 may not be formed on a portion of the first and second substrates 230 and 240 corresponding to the space dividing portions 244.

The lamp body 200 may further include a protective layer (not shown) formed between the first substrate 230 and the light-reflecting layer 270 and/or the second substrate 240 and the second fluorescent layer 284. The protective layer prevents chemical reaction between mercury (Hg) in the discharge gas and the first and second substrates 230 and 240, thereby preventing loss of mercury and inhibiting blackening phenomena.

The external electrode 300 is formed on at least one of the outer surfaces of the first and second substrates 230 and 240. The external electrode 300 is disposed over a longitudinal end portion of the discharge space portions 242. The external electrode 300 extends in a direction substantially perpendicular to a longitudinal direction of the discharge space portions 242 to intersect the discharge spaces 210. The external electrode 300 comprises electrically conductive material in order to apply a discharge voltage to the discharge gas in the discharge spaces 210. Silver (Ag) paste that is a mixture of silver and silicon oxide $SiO_2$ may be coated on at least one of the outer surfaces of the first and second substrates 230 and 240 to form the external electrode 300. Alternatively, metal powder including metal or metallic mixture may be spray coated to form the external electrode 300. The external electrode 300 formed on the first substrate 230 and the external electrode 300 formed on the second substrate 240 may be electrically connected to each other by a conductive clip (not shown).

Figure 4:
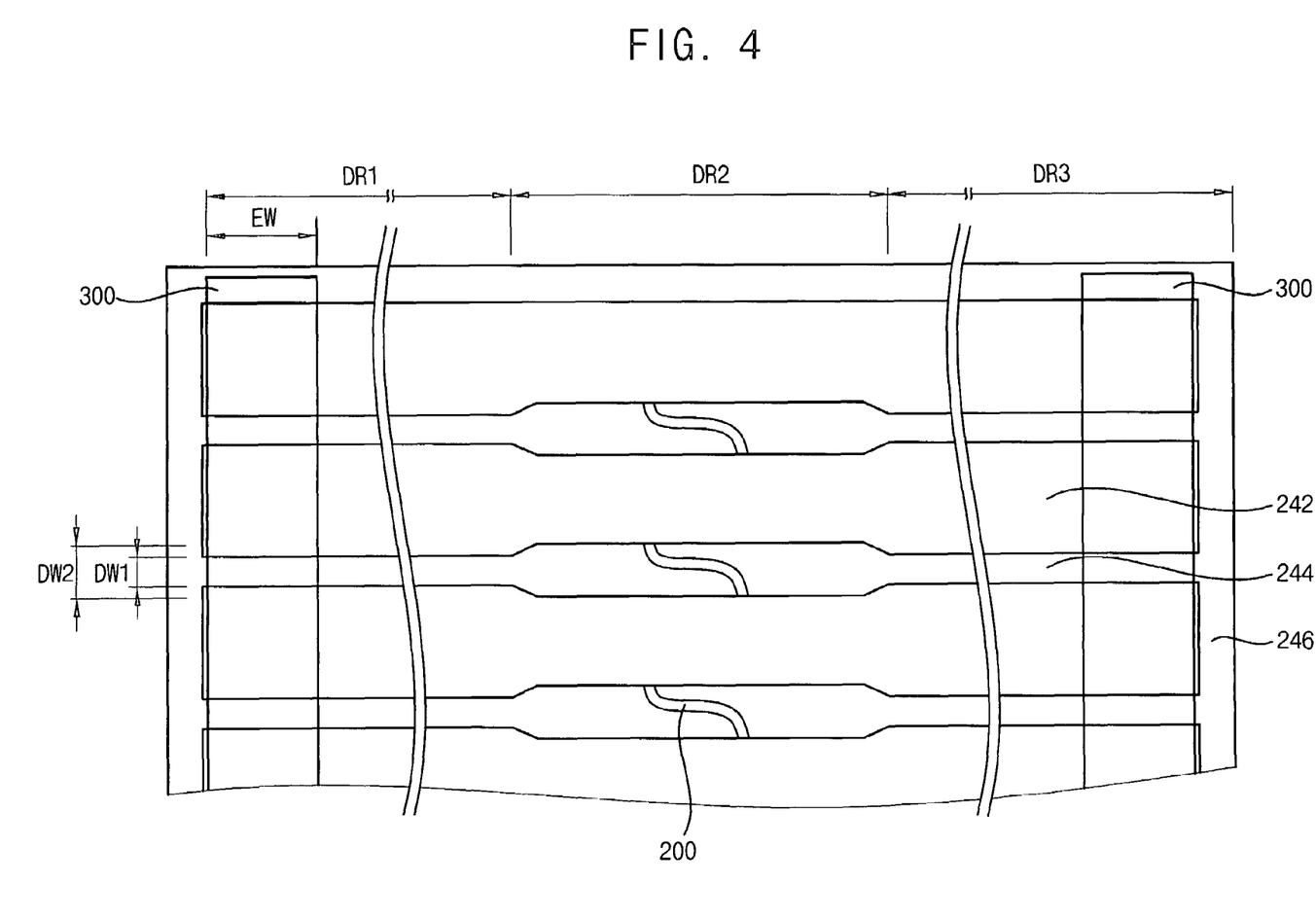
FIG. 4 is an enlarged plan view illustrating a portion of the flat fluorescent lamp shown in FIG. 2.

FIG. 4 is an enlarged plan view illustrating a portion of the flat fluorescent lamp shown in FIG. 2.

Referring to FIGS. 2 and 4, each of the space dividing portions 244 are positioned between the discharge space portions 242. Each of the space dividing portions 244 includes a first division region DR1 corresponding to the first discharge region SR1, a second division region DR2 corresponding to the second discharge region SR2, and a third division region DR3 corresponding to the third discharge region SR3. The first division region DR1 has a first division width DW1, the second division region DR2 has a second division width DW2 that is wider than the first division width DW1, and the third division region DR3 has a third division width DW3 that is substantially same as the first division width DW1. The first and second division widths DW1 and DW2 correspond to a width along a direction substantially perpendicular to a longitudinal direction of the space dividing portions 244. The first, second and third division regions DR1, DR2 and DR3 have a first division length, a second division length and a third division length, respectively. The first and third division lengths are longer than the second division length, and the first and third division lengths are substantially same. The second division region DR2 is disposed between the first and third division regions DR1 and DR3.

The first division length of the first division region DR1 is longer than the electrode width EW of the external electrode 300. The width of the first division region DR1 gradually increases to form the second division region DR2 having the second division width DW2. In other words, a tapered portion is formed between the first and second division regions DR1 and DR2. In addition, the electrode width EW is smaller than the first division length. Thus, a tapered portion, where the first and second division regions DR1 and DR2 meet each other, is spaced apart from the external electrode 300, thereby preventing blackening of the tapered portion. As the first and third division lengths of first and third the division regions DR1 and DR3 are made longer, bright lines that are displayed on the screen are reduced. However, when the second division length becomes too short, forming a connection passage 220 becomes difficult. Therefore, the first and third division lengths of the first and third division regions DR1 and DR3 are adjusted by the connection passage 220.

For example, the electrode width EW of the external electrode 300 is about 15 mm, and the division length of the first division region DR1 is about 20 mm from the edge of the sealing portion 246.

The connection passage 220 is formed on the second division region DR2 of each of the space dividing portions 244. The second division region DR2 has a division width wider than the first division region DR1 in order to from the connection passage 220. For example, the first division width DW1 of the first division region DR1 is about 2 mm, and the second division width DW2 of the second division region DR2 is about 4 mm.

Figure 5:
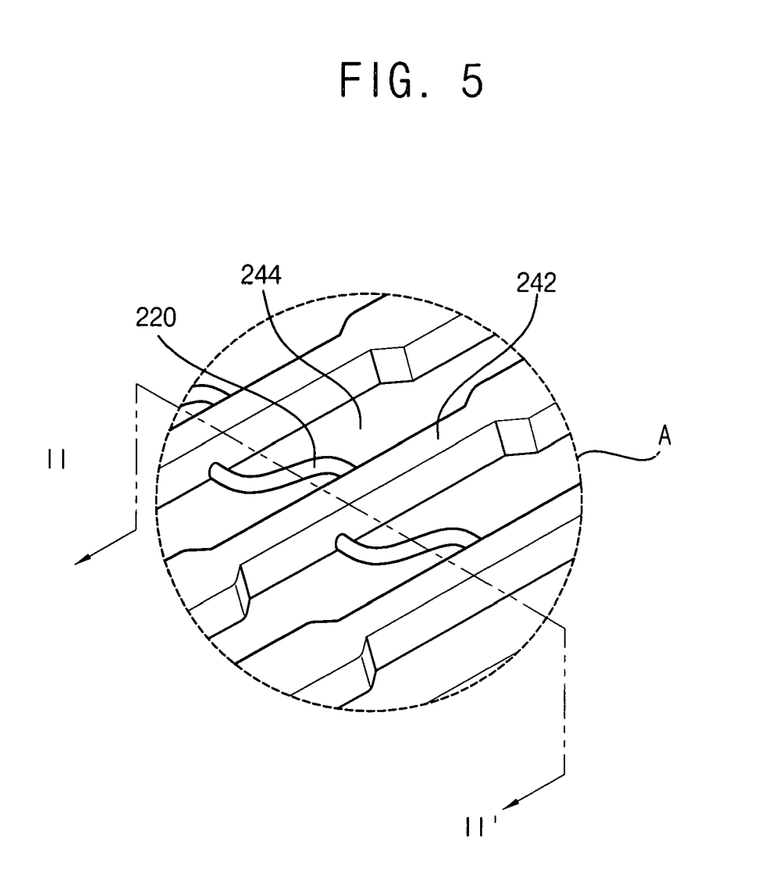
FIG. 5 is an enlarged view of a portion 'A' in FIG. 1.
Figure 6:
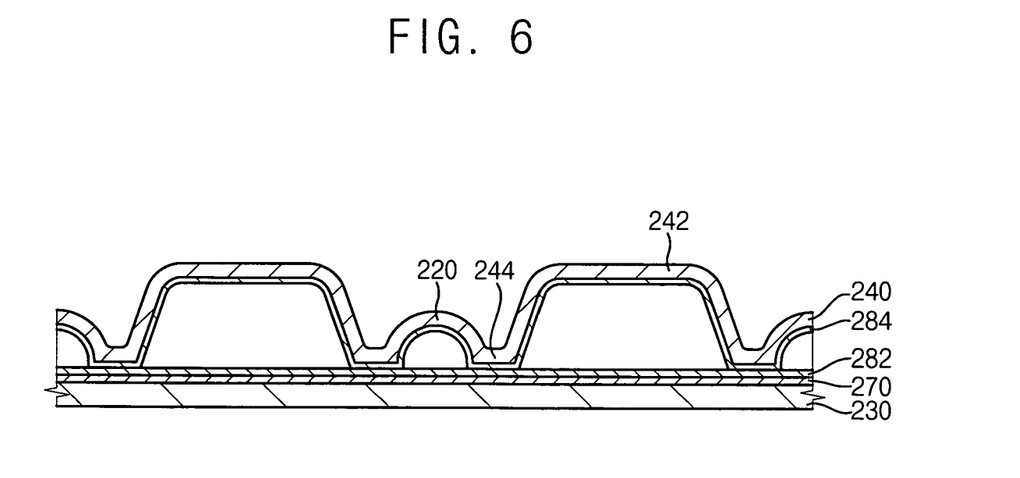
FIG. 6 is a cross-sectional view taken along a line II-II' in FIG. 5.

FIG. 5 is an enlarged view of a portion 'A' in FIG. 1. FIG. 6 is a cross-sectional view taken along a line II-II' in FIG. 5.

Referring to FIGS. 5 and 6, the connection passage 220 is simultaneously formed through a forming process of the second substrate 240. The connection passage 220 provides a passage through which air and discharge gas may flow. When the air in the discharge spaces 210 is exhausted and the discharge gas is injected into the discharge spaces 210, the air and the discharge gas may flow therethrough, respectively. When the first and second substrates 230 and 240 are combined with each other, a portion of the second substrate 240 is spaced apart from the first substrate 230 to define the connection passage 220.

The connection passage 220 may have various shapes connecting neighboring discharge spaces 210 to each other. The connection passage 220, for example, is curvedly formed along a longitudinal direction of the space dividing portions 244. In the present embodiment, the connection passage 220 has an S-shape along the longitudinal direction of the space dividing portions 244. Thus, length of the connection passage 220 is longer than distance between the neighboring discharge spaces 210, wherein the distance corresponds to a division width of the space dividing portions 244. As a result, as the length of the connection passage 220 increases, the path of current flow between the neighboring discharge spaces 210 is lengthened. Therefore, for example, interference between adjacent discharge spaces 210 caused by current channeling between the neighboring discharge spaces 210 is effectively prevented. The connection passage 220 has, for example, a width of about 2 mm, and a height of about 2 mm.

Figure 7:
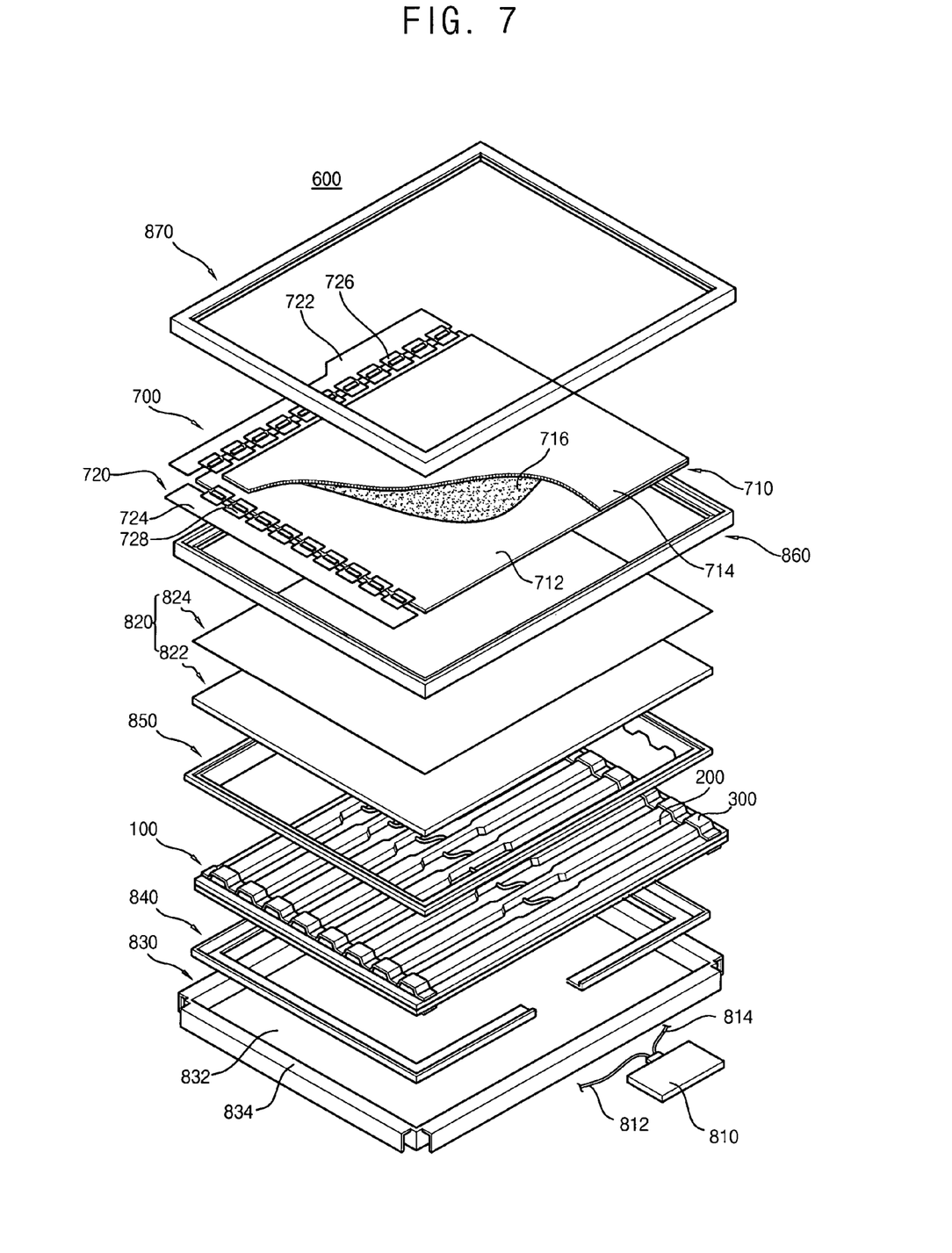
FIG. 7 is an exploded perspective view illustrating a liquid crystal display device according to an exemplary embodiment of the present invention.
Figure 8:
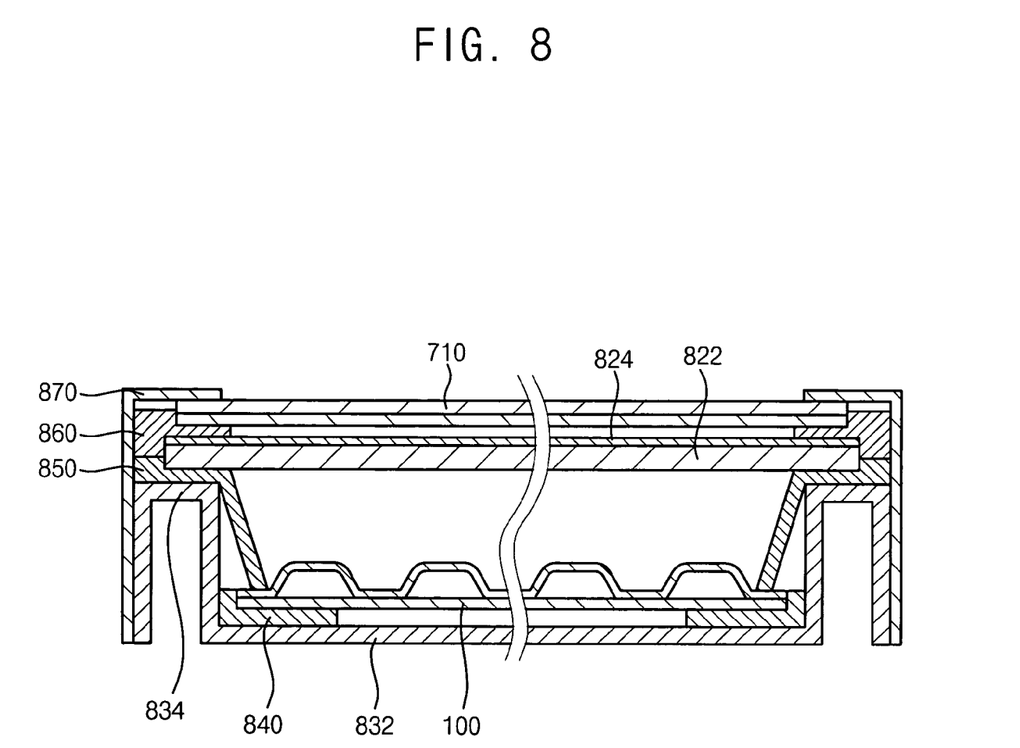
FIG. 8 is a cross-sectional view illustrating the liquid crystal display device shown in FIG. 7.

FIG. 7 is an exploded perspective view illustrating a liquid crystal display device according to an exemplary embodiment of the present invention. FIG. 8 is a cross-sectional view illustrating the liquid crystal display device shown in FIG. 7.

Referring to FIGS. 7 and 8, a liquid crystal display (LCD) device 600 includes a flat fluorescent lamp 100 providing light and a display unit 700 displaying an image using the light provided from the flat fluorescent lamp 100.

The flat fluorescent lamp 100 includes a lamp body 200 including a plurality of discharge spaces to generate the light and an external electrode 300 formed on an end portion of the lamp body 200 such that a longitudinal direction of the external electrode 300 is substantially perpendicular to a longitudinal direction of the discharge spaces. Each of the discharge spaces includes a first discharge region having a first space width, a second discharge region having a second space width that is narrower than the first space width, and a third discharge region having a third space width that is substantially same as the first space width. The flat fluorescent lamp 100 has a structure substantially identical to the flat fluorescent lamp shown in FIGS. 1 through 6. Thus, the same reference numerals will be used to refer to the same parts and any further description concerning the same parts will be omitted.

The display unit 700 includes an LCD panel 710 displaying an image using the light provided by the flat fluorescent lamp 100 and a driving circuit part 720 driving the LCD panel 710.

The LCD panel 710 includes a first substrate 712, a second substrate 714 combined with the first substrate 712 and a liquid crystal layer 716 interposed between the first and second substrates 712 and 714.

Thin film transistors (TFTs) are formed on the first substrate 712 in a matrix shape. The first substrate 712 includes, for example, glass. A data line is electrically connected to a source terminal of each TFT, and a gate line is electrically connected to a gate terminal of each TFT. A pixel electrode including a transparent conductive material is electrically connected to a drain terminal of each TFT.

RGB pixels are formed on the second substrate 714 in thin film form. The first substrate 714 includes, for example, glass. A common electrode including a transparent conductive material is formed on the second substrate 714.

In the LCD panel 710 having above-described structure, when an electric power is applied to the gate terminal of the TFT, and the TFT is turned on, electric fields are generated between the pixel and common electrodes to rearrange molecules of the liquid crystal layer 716 between the first and second substrates 712 and 714. When an arrangement of the liquid crystal molecules is changed, optical transmissivity thereof is also changed to display an image having a desired gradation.

The driving circuit part 720 includes a data printed circuit board (PCB) 722 providing the LCD panel 710 with data signals, a gate PCB 724 providing the LCD panel 710 with gate signals, a data flexible circuit film 726 connecting the data PCB 722 to the LCD panel 710, and a gate flexible circuit film 728 connecting the gate PCB 724 to the LCD panel 710. The data flexible circuit film 726 and the gate flexible circuit film 728, for example, include a tape carrier package (TCP). Alternatively, the data and gate flexible circuit films 726 and 728 may include a chip on film (COF).

The data PCB 722 is disposed on a lateral face or a rear face of a receiving container 830 receiving the flat fluorescent lamp 100 by bending the data flexible circuit film 726. The gate PCB 724 is disposed on a lateral face or a rear face of the receiving container 830 by bending the gate flexible circuit film 728. Alternatively, the gate PCB 724 may be replaced with signal lines formed on the LCD panel 710 and/or the gate flexible circuit film 728.

The LCD device 600 further includes an inverter 810 driving the flat fluorescent lamp 100 and an optical member 820 disposed over the flat fluorescent lamp 100.

The inverter 810 generates a discharge voltage for driving the flat fluorescent lamp 100. The inverter 810 receives an external alternating voltage at a low level and generates the discharge voltage having a high level sufficient for driving the flat fluorescent lamp 100. The inverter 810 is disposed at a lower surface of the receiving container 830. The discharge voltage is applied to the external electrode 300 of the flat fluorescent lamp 100 through a first wire 812 and a second wire 814.

The optical member 820 is disposed between the flat fluorescent lamp 100 and the LCD panel 710. The optical member 820 enhances luminance characteristics of light emitted from the flat fluorescent lamp 100 to provide the LCD panel 710 with light. The optical member 820 includes a light-diffusing plate 822 and at least one optical sheet 824. The light-diffusing plate 822 is disposed over the flat fluorescent lamp 100 to diffuse the light emitted from the flat fluorescent lamp 100. The optical sheet 824 is disposed over the light-diffusing plate 822 to change an optical path of the light.

The light-diffusing plate 822 diffuses the light emitted from the flat fluorescent lamp 100 to improve luminance uniformity thereof. The light-diffusing plate 822 having a plate shape is spaced apart from the flat fluorescent lamp 100. The light-diffusing plate 822 includes a transparent material for transmitting light, and may include a diffusing agent for diffusing light therein. The light-diffusing plate 822 comprises, for example, polymethyl methacrylate (PMMA)

The optical sheet 824 changes a path of light diffused by the light-diffusing plate 822, thereby improving luminance characteristics. The optical sheet 824 may include a light-condensing sheet condensing the light diffused by the light-diffusing plate 822 in a front view direction, thereby improving front-view luminance. In addition, the optical sheet 824 may include a light-diffusing sheet diffusing once more the light diffused by the light-diffusing plate 822. The display device 600 may optionally include or exclude various optical sheets according to the desired luminance characteristics.

The LCD device 600 further includes a receiving container 830 receiving the flat fluorescent lamp 100. The receiving container 830 includes a bottom part 832 and a lateral part 834 extending from an edge portion of the bottom part 832 to define a receiving space. The lateral part 834, for example, has a U-shape to provide a space for combining with various elements and to enhance a combining force with the elements. The receiving container 830 comprises, for example, metal having high strength and high stiffness.

The LCD device 600 may further include a liner member 840 disposed between the flat fluorescent lamp 100 and the receiving container 830 to support the flat fluorescent lamp 100. The liner member 840 is correspondingly disposed to an edge portion of the flat fluorescent lamp 100 to space the flat fluorescent lamp 100 apart from the receiving container 830 by a predetermined interval, thereby preventing the flat fluorescent lamp 100 from being electrically connected to the receiving container 830. Thus, the liner member 840 comprises an electrically insulating material. In addition, the liner member 840 may include an elastic material for absorbing an impact. For example, the liner member 840 may comprise silicon. In the present embodiment, the liner member 840 has two segments, where each segment has a U-shape. Alternatively, the liner member 840 may include four segments corresponding to four sides or four corners of the flat fluorescent lamp 100, respectively. Alternatively, the liner member 840 may be integrally formed in a frame shape.

The LCD device 600 optionally includes a first molded frame 850 disposed between the flat fluorescent lamp 100 and the light-diffusing plate 822. The first molded frame 850 fastens an edge portion of the flat fluorescent lamp 100 to the receiving container 830 and supports the light-diffusing plate 822. The first molded frame 850 is coupled to the lateral part 834 of the receiving container 830. The first molded frame 850 is integrally formed in a frame structure as shown in FIG. 7. Alternatively, the first molded frame 850 may be formed in a segmented structure having two or four segments.

The LCD device 600 optionally includes a second molded frame 860 disposed between the optical sheet 824 and the LCD panel 710. The second frame 860 fastens the optical sheet 824 and the light-diffusing plate 822 to the receiving container 830, and supports the LCD panel 710. Similar to the first molded frame 850, the second molded frame 860 may be either integrally formed in a frame structure or formed in a segmented structure having two or four pieces.

The LCD device 600 optionally includes a top chassis 870. The top chassis 870 surrounds an edge portion of the LCD panel 710 and is combined with the receiving container 830 to fasten the LCD panel 710 to an upper portion of the second molded frame 860. The top chassis 870 prevents the LCD panel 710 from being damaged by an exterior impact and also prevents the drifting of the LCD panel 710 from the second molded frame 860.

According to the flat fluorescent lamp and the LCD device having the flat fluorescent lamp, a tapered portion where the first and second discharge regions meet each other does not overlap with the external electrode to inhibit blackening due to dendrites generated at an electrode part of the flat fluorescent lamp, thus improving display quality of the LCD device.

In addition, the space width of the discharge space overlapped with the external electrode is broadened, so that discharge efficiency of the flat fluorescent lamp is improved and optical luminance thereof increases.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A liquid crystal display (LCD) device comprising:
  a flat fluorescent lamp configured to generate light, the flat fluorescent lamp comprising:
    a lamp body comprising a plurality of discharge spaces, each of the discharge spaces comprising a first discharge region having a first space width and a first s pace length, a second discharge region having a second space width and a second space length, and a third discharge region having a third space width and third space length, the second discharge region being disposed between the first and third discharge regions, the second space width being smaller than the first and third space widths, and the second space length being smaller than the first and third space lengths; and
    an external electrode formed on an end portion of the lamp body; and
  an LCD panel configured to display an image by using the light provided by the flat fluorescent lamp.

2. The LCD device of claim 1, wherein the first space width is substantially equal to the third space width, and the first space length is substantially equal to the third space length.

3. The LCD device of claim 2, wherein a width of the external electrode is smaller than one of the first space length of the first discharge region and the third space length of the third discharge region.

4. The LCD device of claim 1, wherein the lamp body comprises:

a first substrate; and a second substrate comprising:

a plurality of discharge space portions spaced apart from the first substrate to define the discharge spaces;

a plurality of space dividing portions, each of the space dividing portions being disposed between adjacent discharge space portions, the space dividing portions making contact with the first substrate; and a sealing portion corresponding to edge portions of the second substrate, the first and second substrates being combined with each other through the sealing portion.

5. The LCD device of claim 4, wherein each of the space dividing portions comprises:

a first division region corresponding to the first discharge region and having a first division width;

a second division region corresponding to the second discharge region and having a second division width that is wider than the first division width; and a third division region corresponding to the third discharge region and having a third division width substantially equal to the first division width.

6. The LCD device of claim 5, wherein the first division region has a first division length longer than a width of the external electrode.

7. The LCD device of claim 1, further comprising:

an inverter generating a discharge voltage that is applied to the external electrode of the flat fluorescent lamp; and an optical member disposed between the flat fluorescent lamp and the LCD panel.

8. The LCD device of claim 7, wherein the optical member comprises:

a light-diffusing plate to diffuse light generated by the flat fluorescent lamp; and at least one optical sheet disposed over the light-diffusing plate to change an optical path of the light.

9. The flat fluorescent lamp of claim 1, wherein the external electrode is formed on the end portion of the lamp body such that a longitudinal direction of the external electrode is substantially perpendicular to a longitudinal direction of the discharge spaces.

* * * * *